March 31, 1964 P. R. NOYE ETAL 3,126,837
CONVEYOR DISPATCH SYSTEM
Original Filed Dec. 2, 1958 3 Sheets-Sheet 1

INVENTORS.
PAUL R. NOYE, WILLIAM H. DEVONSHIRE,
HUMPHREY F. PARKER AND CHARLES N. HUBBELL
BY
*Beau, Brooks, Buckley + Beau.*
ATTORNEYS March 31, 1964 P. R. NOYE ETAL 3,126,837
CONVEYOR DISPATCH SYSTEM
Original Filed Dec. 2, 1958 3 Sheets-Sheet 3

INVENTORS.
PAUL R. NOYE, WILLIAM H. DEVONSHIRE,
HUMPHREY F. PARKER AND CHARLES N. HUBBELL
BY
Beau, Brooks, Buckley + Beau.
ATTORNEYS

United States Patent Office 3,126,837
Patented Mar. 31, 1964

3,126,837
CONVEYOR DISPATCH SYSTEM
Paul R. Noye, Tonawanda, William H. Devonshire, Williamsville, Humphrey F. Parker, Buffalo, and Charles N. Hubbell, Tonawanda, N.Y., assignors to Columbus McKinnon Corporation, Tonawanda, N.Y.
Original application Dec. 2, 1958, Ser. No. 777,758. Divided and this application June 5, 1961, Ser. No. 120,861
11 Claims. (Cl. 104—88)

This invention relates to automatic dispatch systems for determining the destinations of load carriers, such as trolleys, moving along a conveyor system having branches, and more particularly relates to the control of route selector means, such as conveyor track switches at the branches, and is a division of copending application Serial No. 777,758, filed December 2, 1958.

In connection with a system of the type including a read-out unit fixed adjacent the conveyor track ahead of each track switch and including on each trolley an encoder unit so oriented as to pass the successive read-out units in close parallel proximity, it is the principal object of the present invention to provide a system of contacts and contact sensor probes respectively placed on the encoder and read-out units in positional permutations, and the system having read-out circuits receiving information from the contact-permutations and actuating the associated track switch to route each trolley in a direction determined by whether or not the encoder unit carried by the trolley bears the particular positional permutation to which the read-out unit is responsive.

It is another important object of the invention to provide a system having a memory whereby each track switch will remain in the position in which the last encoder unit to pass left it, and wherein the switch is not moved to a different position unless a trolley comes along bearing contradictory intelligence on its encoder unit, this feature reducing wear on the switches.

It is a major object of the invention to provide a read-out circuit having a memory for the track-switch position wherein the track switch is always moved to one position if the permutation positions all make contact simultaneously as an encoder unit passes, and wherein the track switch is either moved to or else remains in the other position if less than simultaneous contact is made.

Still another object of the invention is to provide a system in which only very light physical contact is made by means of probes in the form of contact brushes on the read-out units which wipe over the surface of the encoder units and over conductive contacts thereon, the contacts being arranged in rows and the rows being separated into adjacent channels by means of non-conductive spacing bars on the encoder unit.

Another important object is to provide novel encoder unit structures and a novel read-out unit structure in which quick and definite selection of one of a finite number of positional permutations may be made.

It is a further primary object of the invention to provide a very sensitive read-out circuit having multiple inputs from the respective permutation positions, the sensitivity of the inputs being especially important in view of the very low probe-contact currents, and the various inputs being fed to an "and" circuit capable of determining whether all of the probes are in simultaneous contact, and, if not, which probes are forwarding information, the circuit then actuating the associated track switch accordingly.

Yet another important object is to provide a circuit having time constant means introducing delay in the reaction of the circuit to eliminate spurious cycling of the read-out circuit caused by slight differences in the instants of actual contact of the brushes where simultaneous contact thereby is intended.

Other objects and advantages of the invention will become apparent during the following discussion of the accompanying drawings, wherein.

Figure 1:
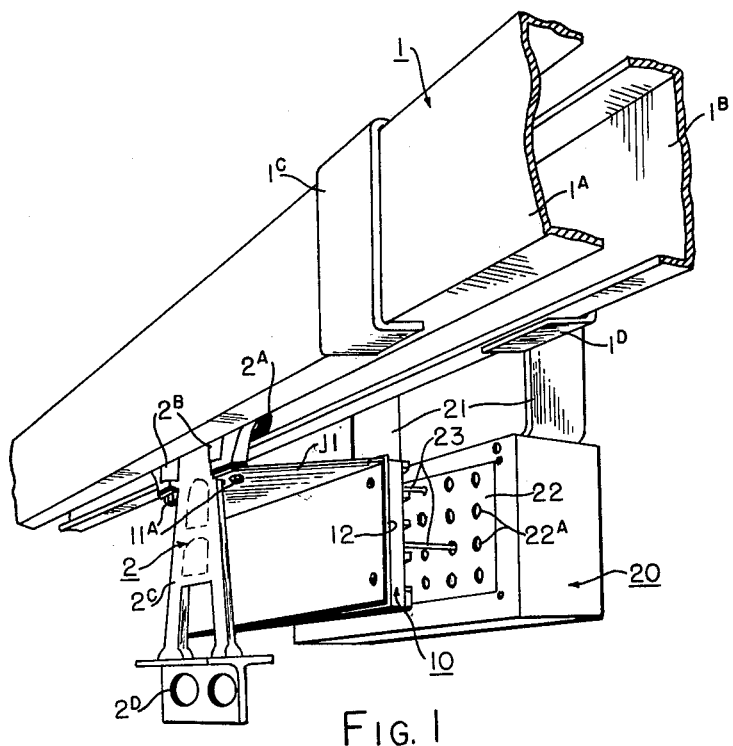
FIG. 1 is a perspective view showing the track of a conveyor and showing a load trolley suspended therefrom, the track supporting a read-out unit, and the load trolley supporting an encoder unit, and the two units being shown passing each other in operative proximity.

Referring now to the drawings, and particularly to FIG. 1, a conveyor track is generally designated by the numeral 1, this conveyor track comprising a pair of channel members 1a and 1b arranged to leave a spacing therebetween in a manner well known in the conveyor art. The channels 1a and 1b may be supported in any convenient way, as for instance by brackets 1c and 1d. A conveyor trolley 2 of conventional type is supported on wheels 2a which travel on the inner surfaces of the channels 1a and 1b, and also includes centering rollers 2b for maintaining the downwardly extending portion 2c of the trolley centered in the space between the lower flanges of the channels 1a and 1b. The trolley 2 may include a T portion 2d from which a load of any desired type may be suspended. The structures specifically discussed thus far form no part of the present invention and are merely included to illustrate an example of a conveyor to which the present dispatch system may be attached.

Figure 10:
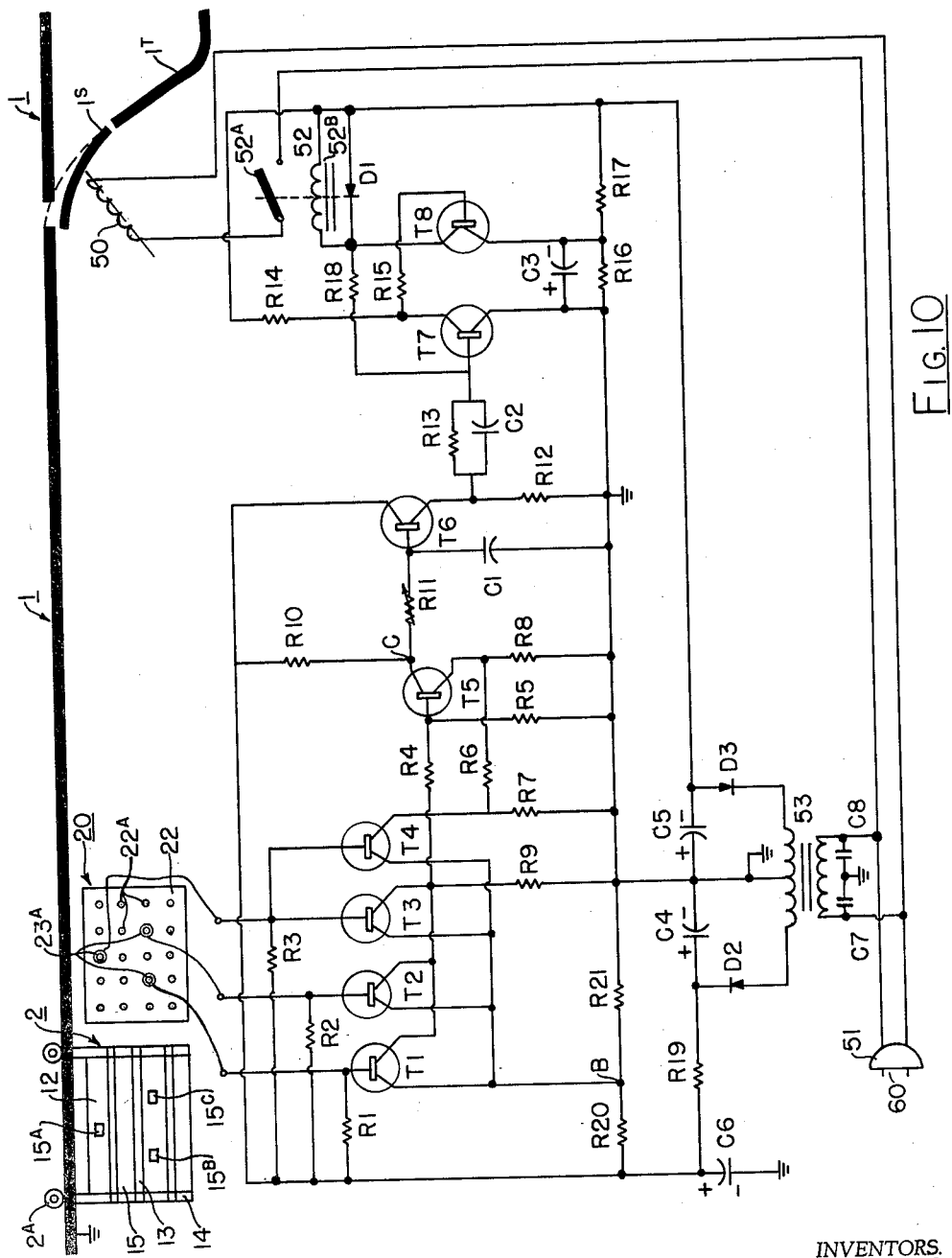
FIG. 10 is a schematic diagram illustrating the electrical control circuit of a read-out unit adjacent a conveyor having a trolley thereon and having a branch track controlled by the electrical circuit.

The dispatch system itself includes an encoder unit 10 and a read-out unit 20, the read-out unit including a circuit shown in FIG. 10 and housed within a suitable cabinet supported adjacent the conveyor by means of suitable brackets 21.

The encoder unit 10 moves with the trolley 2 and is supported thereon at the flange of a bracket 11 by screws 11a which pass through the flange and into some convenient part of the trolley 2.

Figure 2:
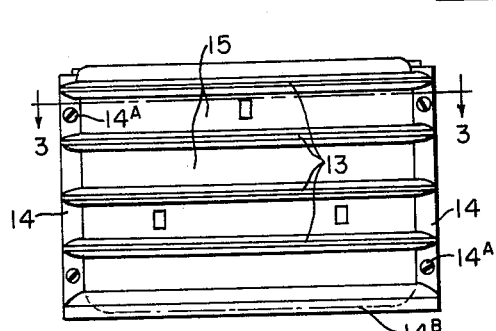
FIG. 2 is an elevation view showing the face of an encoder unit, this plate being enlarged as compared with the size thereof in FIG. 1.
Figure 4:
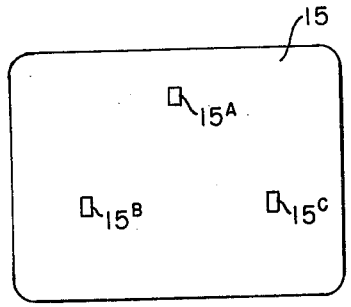
FIG. 4 is an elevation view of a code card of the type employed in conjunction with the encoder unit shown in FIG. 2.
Figure 3:
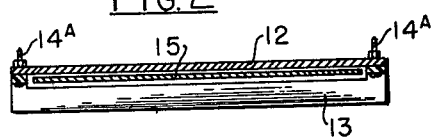
FIG. 3 is a section view taken along line 3—3 of FIG. 2.

The encoder unit also includes a vertically oriented plate 12 (FIGS. 1 and 3). This plate 12 is electrically connected to ground via the bracket 11 and trolley structure and carries on one of its faces a plastic grid structure which includes, as illustrated in FIGS. 2 and 3, four insulated spacing bars 13 which are joined at their ends by two vertically disposed plastic strips 14 attached to the plate 12 by means of screws 14a. A plastic strip 14b is also provided across the bottom of the grid. In the slot formed by the spacing bars 13 near the plate 12, a code card 15 is inserted, this code card having a plurality of holes 15a, 15b and 15c punched therein. The card is made of non-conductive material and is intended to electrically mask the plate 12 except at the contact areas where the holes 15a, 15b and 15c are punched through the card 15. The manner of operation will be more fully discussed hereinafter. In FIGS. 2 and 4 only three holes are shown in the card 15, but it is to be understood that any number of holes with any desired locations may be employed to fit the needs of the particular application.

The read-out unit 20 also includes a permutation plate 22, as can best be seen in FIGS. 1 and 10. The non-conductive plate 22 has four horizontal rows of holes 22a, these rows being arranged such that when the encoder unit 10 passes the read-out unit 20 the rows of holes 22a are located opposite the channels formed between the spacing bars 13 in the plastic grid. As can best be seen in FIG. 1, a plurality of contact brushes 23 are inserted in certain selected holes 22a corresponding to the designated code for a given switch station and these contact brushes 23 are electrically connected to the inputs of an electronic read-out circuit, as shown in FIG. 10, by contact brush-mounting means 23a which are located on the plate 22 for the purpose of contacting the conductive stem portion of the brushes 23.

Thus it should be apparent that as the trolley 2 carries the encoder plate 10 past a read-out unit 20, the contact brushes 23 will each be guided into a definite channel in the encoder unit by the plastic spacing bars 13. As the trolley passes by the read-out unit 20 the contact brushes wipe across the face of the encoder unit but make electrical contact to ground only through the holes 15a, 15b and 15c in the code card 15. Every time a contact brush 23 passes over the code card 15, the contact brush is either electrically grounded through a hole to the plate 12 or, in the rows in which there are no holes through the code card 15, the contact brush passes over the channel between the spacing bars 13 without making electrical contact to ground.

Figure 5:
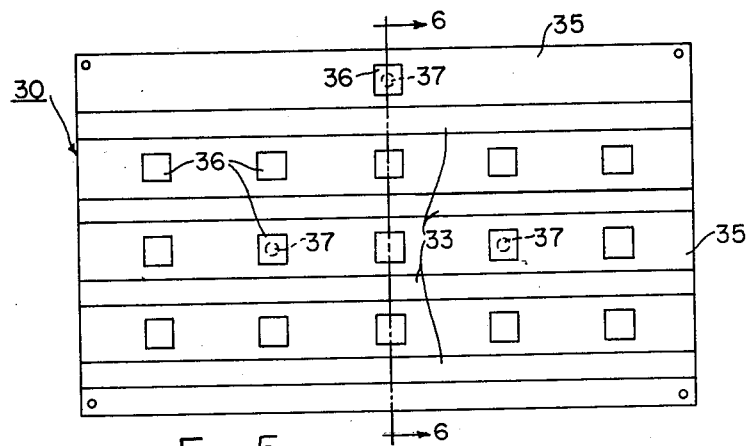
FIG. 5 is an elevation view showing the face of a modified form of encoder unit.
Figure 6:
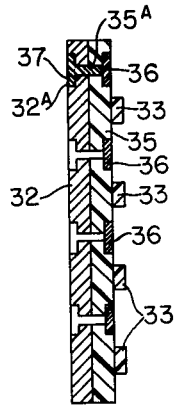
FIG. 6 is a section view taken along line 6—6 of FIG. 5.

A modified form of encoder unit is shown in FIGS. 5 and 6 wherein the grounded metal plate 32 functionally corresponds with the plate 12 in the modification shown in FIG. 2 and wherein a plate of insulating material 35 functionally corresponds with the code card 15, as shown in FIGS. 2 and 4. The channels on the face of this encoder unit are defined by the spacing bars 33 which are also of insulating material, and a plurality of separate contact areas in the form of plates 36 are provided on the face of the encoder unit plate 35. These contact plates 36 are made of a conductive material, but ordinarily they are not grounded since they are recessed and supported in the face of the insulating plate 35.

As shown at the top of FIG. 6, a contact plate 36 may be grounded to the metal plate 32 by inserting a pin 37 in the countersunk hole 32a in the metal plate 32, which hole aligns with a similar hole 35a in the plate 35. When the pin 37 is inserted from the rear, it touches the contact plate 36 and thereby grounds it. Thus, those contacts which are grounded by pins 37 correspond with the contact areas on the plate 12 of FIG. 2 which are exposed through the holes 15a, 15b and 15c in the code card 15. By removing the pins 37 and inserting them in different holes, a number of different permutations can be formed wherein different contact plates 36 are selectively rendered operative by grounding via the pins 37.

Figure 7:
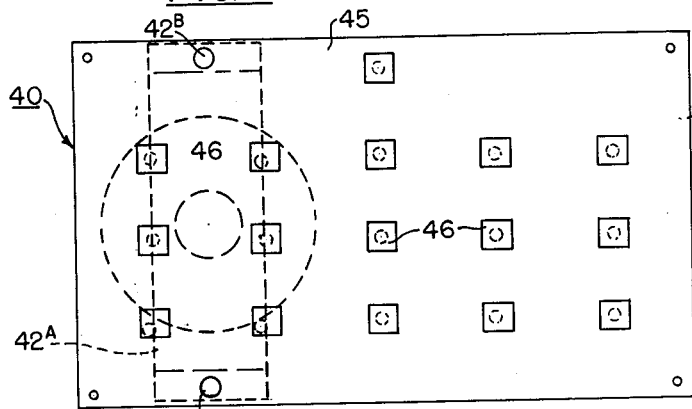
FIG. 7 is an elevation view showing the face of a further modified form of encoder unit.
Figure 8:
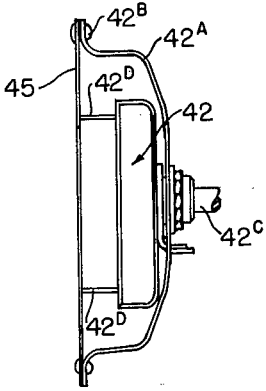
FIG. 8 is an end view of the encoder unit shown in FIG. 7.
Figure 9:
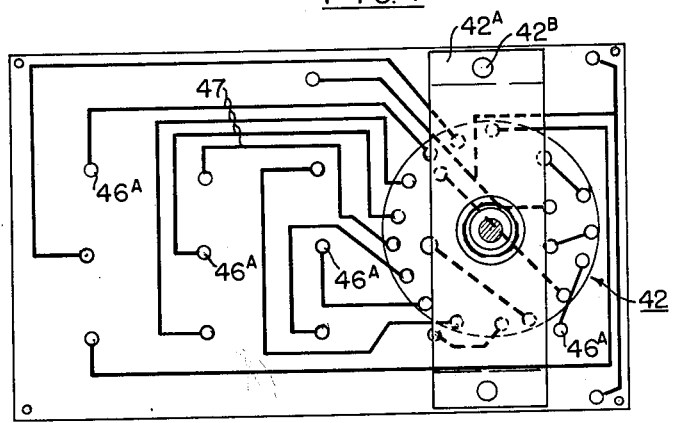
FIG. 9 is an elevation view of the rear of the encoder unit shown in FIG. 7.

Still another modified form of encoder unit 40 is shown in FIGS. 7, 8, 9, this type being well adapted for use with printed circuit boards. This encoder unit comprises an insulating plate 45 including laminated metallic contact areas 46 on the face thereof, as shown in FIG. 7. These areas 46 are spaced substantially the same as those of the embodiments shown in FIGS. 2 and 5, but the means for selectively grounding certain of the contacts 46 includes a switch 42, as shown in FIGS. 8 and 9. This switch has a plurality of lugs on the back thereof and is designed so that it can be rotated to selectively ground any of the desired contacts 46. The switch is held on the board 45 by means of a bracket 42a which is retained on the board 45 by means of rivets 42b. The switch 42 includes a shaft 42c and is preferably of the type employed with printed circuit boards, this switch including spaced lugs 42d which can be inserted in the holes in the printed circuit board and soldered thereto. One possible wiring diagram is shown in FIG. 9 wherein the various switch lugs are connected to the various contacts 46 as at 46a by means of conductors 47. The main wiper contacts (not shown) of the switch 42 are connected to ground. It is to be further understood that the board 45 of this modification of the encoder unit may be provided with more than one switch 42 and may preferably include several switches mounted on the trolley and having indicia which align with selector knobs on the switches for the purpose of selecting contacts in various permutations. By this means, each switch could select one contact in a given zone of the encoder and the particular permutation selected could be easily read by observing the indicia to which the switch pointers are directed. In the modifications shown respectively in FIGS. 5 and 7, the various horizontal contact rows do not all contain the same number of contact areas, the top row in each case having only one contact area referred to as the reference contact area. However, it is to be understood that a full row of contacts could be provided in each case if desired.

Referring now to FIG. 10, the conveyor track 1 is schematically shown at the top thereof, and this track includes a track switch 1s located at a branch track 1t, it being understood that there may be a plurality of branches on the conveyor. This particular track switch 1s is of the normally open variety, that is, the switch is normally in the position shown in FIG. 10. However, when the winding 50 is energized the switch 1s is moved into the dashed-line position and remains there until the winding 50 is deenergized.

The power for the operation of the entire circuit of FIG. 10 is derived from the power lines schematically represented by the plug 51, and the energizing of the winding 50 is controlled by the relay 52 having a set of normally open contacts 52a and having a winding 52b.

As stated above, the read-out unit 20 includes an insulating plate 22 having a plurality of holes 22a therethrough. Selected ones of these holes 22a will receive and retain contact brushes 23 which are contacted by brush mounting means 23a which are in turn respectively connected by wires to the base terminals of transistors T1, T2, T3 and T4. There are three contact brushes 23 employed in the example illustrated in the present drawings, and it will be noted that the topmost one of these contact brushes is connected to the bases of two transistors T3 and T4. The transistors T1, T2, and T3 have their emitters connected together and returned to ground through a load resistance R9, and also have their collectors connected to a source of positive potential at point B. The transistor T4 also has its collector connected to this source of positive potential. The transistors T1, T2, T3, T4, T5 and T6 are NPN type. The remaining two transistors T7 and T8 are PNP type, in the embodiment of the present schematic diagram.

Transistors T1, T2 and T3 comprise an "and" circuit and transistor T4 comprises a reference amplifier, and the outputs of these four transistors are connected with the transistor T5 which comprises an interpreter stage. The bases of transistors T1 through T4 inclusive are biased forwardly by the resistors R1, R2 and R3, thereby rendering these transistors conductive. Transistors T1 through T3 inclusive comprise three parallel-connected electronic valves operating as switches which when conductive supply forward bias to the base of the interpreter stage transistor T5 though the resistor R4 which forms with resistor R5 a voltage divider to ground.

The transistor T4 also operates as an electronic valve which forms a path to the source of positive voltage at points B and this path is connected to the emitter of transistor T5 by the resistance R6 which forms with resistances R7 and R8 a voltage divider to ground. The resistance R8 is also the emitter bias resistor for the transistor T5. Resistance R9 merely serves the purpose of adjusting the bias on the emitters of the transistors T1, T2 and T3 to compensate for the fact that different numbers of these transistors may be conductive at any one instant of time. The transistor T5 has its collector connected to a source of positive voltage through the resistance R10 and this collector is also connected to the base of a common collector configuration amplifier stage T6 via the resistance R11. This resistance R11 forms with the condenser C1 a time constant which may be varied by the adjustment of the resistance R11 for the purpose hereinafter stated.

The output of the amplifier transistor T6 appears across the resistance R12 and is applied to the base of the transistor T7 by the resistance R13 connected in parallel with the condenser C2 which forms a coupling network.

Transistors T7 and T8 are PNP type and are connected to form a bistable flip-flop in the form of a multivibrator. The output of the transistor T7 appears across the load resistance R14 which is connected to a source of negative voltage. The base of transistor T8 is returned to the collector of the transistor T7 by the resistance R15. The resistance R16 with the condenser C3 thereacross provides bias at the emitter of the transistor T8 and this bias is returned to the source of negative voltage by the resistance R17. In the collector circuit of the transistor T8 the winding 52b of the relay 52 is connected to the source of negative voltage and forms the load for this transistor. Since this is a bistable multivibrator circuit, the base of the transistor T7 is returned to the collector of the transistor T8 by resistance R18. The diode D1 is connected in shunt across the winding 52b of the relay 52.

The positive and negative sources of power include a transformer 53 having a primary winding connected across the power line and having a secondary winding including a center-tap connected to ground. Two rectifier diodes D2 and D3 are connected in series with the respective ends of the secondary winding, but are connected in opposite directions so that the rectified output of the diode D2 is positive and the rectified output of the diode D3 is negative. Filter condensers C4 and C5 are connected across the outputs of the respective rectifier diodes, and the positive voltage appearing across the condenser C4 is filtered by a resistance R19 and another condenser C6. The filtered positive voltage appearing across the condenser C6 is then applied directly to the collector of the transistor T6 and also to the load resistance R10 of the transistor T5. This positive potential is reduced by voltage dividers R20 and R21 and thence applied at point B to the collectors of the transistors T1 through T4 inclusive. Suitable filtering condensers C7 and C8 may be applied across the primary winding of the transformer 53 for the purpose of reducing the effect of external transients.

*Operation*

The manner of operation of the various units described in connection with the drawings will be explained particularly with reference to the schematic diagram in FIG. 10.

As a trolley 2 moves to the right on the track 1, the contact brushes 23, FIG. 1, will brush along the channels formed by the spacing bars 13, and as the contact brushes pass over the face of the code card 15 the uppermost brush 23 will contact the plate 12 through the hole 15a and the two lower contact brushes will contact the plate 12 through the two lower holes 15b and 15c. The plate 12 is electrically connected back to the encoder circuit by a common return path which in the embodiment shown in FIG. 10 is a ground path through the trolley 2 and the track 1. As illustrated in the present drawings, the permutation carried by the encoder unit 10 is identical with the permutation which has been set up upon the plate 22 of the read-out unit 20, and therefore all three contact brushes 23 will contact the grounded plate 12 through the holes in the code card 15 simultaneously.

There are a plurality of contact possibilities which can occur. One possibility occurs when the reference contact brush 23 and less than all of the other contact brushes are grounded. Another possibility occurs when any or all of the other contact brushes are grounded to the plate 12, but the reference contact brush 23 is not so grounded. Still another possibility occurs when all contact brushes are simultaneously grounded, and the final possibility occurs when none of the contact brushes is grounded. For the sake of clarity, these four possibilities will be considered separately hereinafter.

As stated above, the multivibrator formed by the transistors T7 and T8 is bistable, and therefore the multivibrator T7 and T8 will remain in whichever condition of conductivity it happens to be, in the absence of further control voltage applied through the resistance R13 and the condenser C2, the latter element serving the purpose of sharpening the triggering pulse fed to the base of the transistor T7. The transistor T6 is a D.C. amplifier, in the form of a common collector circuit wherein the voltage across the resistance R12 follows the voltage applied to the base of the transistor T6. The resistance R11 and condenser C1 form an integrator with a selectable time constant at the base of the transistor T6, which integration serves to remove transients from the control voltage which occur as a result of the fact that the contact brushes 23 may not all be grounded at the same exact instant of time.

Turning now to a discussion of the transistors T1 through T5, the transistor T5 is an interpreting state delivering output potentials comprising at any instant of time one of three different voltages. The level of the output voltage is controlled in one manner by the transistors T1–T3 inclusive and in a different manner by the transistor T4. Ordinarily when none of the contact brushes 23 is grounded, the transistors T1–T4 are all maintained conductive, these transistors operating as switches. When all four of these transistors are conductive, no contact brush grounded, the left end of resistance R4 is conducted through transistors T1, T2 and T3 to the positive-potential point B between the voltage divider resistances R20 and R21. Thus, a positive voltage is applied to the voltage dividers R4 and R5 and a predetermined forward bias is applied to the base of the transistor T5. Likewise, the transistor T4 acts as a switch and is conductive to apply voltage from the point B to the resistance network R6, R7 and R8 to bias the emitter of the transistor T5 toward the positive voltage at the point B. The voltage applied at the emitter of the transistor T5 and the forward bias applied to the base of the transistor T5 cause it to be conductive and to maintain a voltage at the point C across the resistance R10 which may be considered as being an average voltage. Thus, the voltage appearing at the point C will be the average value whenever all of the transistors T1 through T4 are conductive, meaning that none of the contact brushes 23 is grounded.

Note, however, that the transistor T3 is connected in parallel with the transistors T1 and T2, and therefore it is possible to ground the brushes connected with the bases of the transistors T1 and T2 and thereby short-circuit the forward bias on their bases provided by the resistances R1 and R2 without affecting the output of the transistor T5. This is because the transistor T3 remains conductive as long as the reference contact brush 23 is grounded and thereby connects the left end of the resistance R4 to the source of positive voltage at the point B. Thus, it appears that when none of the contact brushes 23 are grounded, or, alternatively, whenever any or all of the contact brushes except the reference one are grounded, the output voltage from the interpreter transistor T5 at the point C will be the aforementioned average voltage value as determined by the transistors T4, T3 and by the resistance R4, R5, R6, R7 and R8.

There are two other voltages which may appear at the point C at the collector of the transistor T5. One of these voltages occurs when only the reference contact brush 23 is grounded. Under these conditions, the transistors T1 and T2 remain conductive, but the forward bias derived from the resistance R3 is grounded and the transistors T3 and T4 are then cut off. Under these conditions, it will be observed that the left end of the resistance R4 is still connected to the source of positive potential at the point B by the transistors T1 and T2, and therefore the forward bias on the base of the transistor T5 is retained. But since the transistor T4 is now cut off, the junction of the resistances R6 and R7 is no longer connected to the potential at point B and the result is that the positive voltage on the emitter of the transistor T5 is greatly reduced. In other words, this voltage then becomes equal to the voltage drop caused by collector current flowing through the resistance R8 and through the resistances R6 and R7 in series and shunted across the resistance R8. The net result is a large reduction in the positive voltage on the emitter of the transistor T5, and therefore this transistor is rendered much more conductive. When the grounding of the reference contact brush 23 has rendered the transistor T5 more conductive, the voltage appearing at the collector C will drop considerably, and the output voltage at point C will be at a minimum.

The drop in voltage at the point C will lower the voltage at the base of the transistor T6 and hence at the emitter of the transistor T6, and since the voltage applied to the base of transistor T7 through the resistance R13 and the condenser C2 has been rendered more negative, the transistor T7 will be biased forwardly and will thereby cut off the transistor T8. When this occurs, current will stop flowing in the relay 52, and its contacts 52a will open and thereby deenergize the winding 50 to open the switch 1s to the position shown in FIG. 10.

Therefore, whenever the reference contact brush 23 is grounded by itself or with less than all of the other brushes grounded, a negative pulse will be applied to the base of the transistor T7 and thereby cause the opening of the switch 1s. As stated above, the multivibrator T7–T8 is bistable, and it may therefore happen that the transistor T7 is already conductive before the arrival of a negative pulse from the amplifier transistor T6. Under these circumstances, the multivibrator will merely retain its condition of conductivity, and the switch 1s if already open will remain open.

The fourth possible condition of the grounding of the contact brushes occurs when all of the contact brushes are simultaneously grounded. Whenever all of the contact brushes are thus grounded, the forward biases appearing across the resistances R1, R2, and R3 will all be short-circuited to ground, and the transistors T1–T4 inclusive will all be rendered simultaneously non-conductive. Under these circumstances, the forward bias applied to the left end of the resistance R4 will disappear since there is no longer any effective path from the resistance R4 to the potential at point B. There will therefore be no forward bias on the base of the transistor T5. Similarly, the transistor T4, being cut off, will no longer supply a path from the junction of the resistance R6 and R7 to the potential at point B, and therefore the emitter of the transistor T5 will no longer to biased. Thus, the effect of cutting off all four of the transistors T1 through T4 is to remove all biases from the transistor T5, at which time it will be substantially non-conductive except for its leakage conductance which is very low. Thus, the potential at the point C will rise almost to the positive potential appearing across the condenser C6 in view of the fact that there will be substantially no voltage drop across the resistance R10. When this happens, the amplifier T6 will be biased strongly in the forward direction and a strong positive potential will appear across the resistance R12. This positive potential when applied to the base of the transistor T7 will cause this transistor to become non-conductive and therefore the multivibrator T7–T8 will change over to the condition of conductivity in which the transistor T8 is carrying current. This current will pass through the winding 52b of the relay 52 and will cause its contacts 52a to close, thereby energizing the winding 50 and causing the switch 1s to move into its closed position, as illustrated in dashed lines.

Once the trolley bearing the encoder unit 10 has passed the read-out unit 20, the circuit will return to the condition in which one of the contact brushes is grounded, which position, as discussed above, provides at the point C of the interpreter stage transistor T5 the average potential which is not sufficient to change the condition of conductivity of the multivibrator T7–T8. Here again, it is important to note that whatever may be the condition of the multivibrator T7–T8, its conductivity will become such as to close the relay 52 whenever all three of the contact brushes 23 are simultaneously grounded.

Accordingly, the switch 1s will be in closed position following the grounding of all of the contact brushes. The switch will be in open position following the grounding of the reference contact brush 23 and less than all of the other contact brushes. The condition of conductivity of the multivibrator T7–T8 will be unchanged whenever only the two lowermost contact brushes are grounded, or else one of them, or whenever none of the contact brushes is grounded. The only time that the switch 1s is moved is in response to the passage of an encoder unit past the read-out unit, bearing permutational information which is contradictory to the information carried by the next preceding encoder unit. This feature of the invention saves wear on the switches 1s and the associated parts required to move them, eliminates the necessity of timing the carriers, and speeds traffic handling. The present example illustrating the operation of the invention in terms of three contacts brushes, furnishes a very large number of possible permutations, but it is to be clearly understood that more brushes or fewer brushes as well as a different number of contact areas can be employed and still furnish a very satisfactory unit. Each time a contact brush is added to the number illustrated in FIG. 10, it would be necessary to add another transistor similar to transistor T1 or T2, having it emitter and its collector connected in parallel with those of the transistors T1 and T2, and having a separate bias resistance similar to R1 or R2 connected to its base. Thus, any number of contact brushes may easily be added. Also, other types of electronic valves, such as vacuum tubes, can be used in place of the transistors in FIG. 10.

One read-out unit of the type shown in FIG. 10 is employed on the conveyor track in the manner shown in FIG. 1 ahead of each switch which leads to a branch track 14. As many such branches, switches, and read-out units as desired may be employed in the setting up of a particular conveyor.

The following components are listed for the circuit of FIG. 10 and provide a specific workable example, wherein:

| | |
|---|---|
| R1, R2, R3 | .39 megohm. |
| R4, R10, R12, R15, R18 | .1 megohm. |
| R5 | 33,000 ohms. |
| R6 | 75,000 ohms. |
| R7 | 18,000 ohms. |
| R8, R17 | 10,000 ohms. |
| R9, R13 | 68,000 ohms. |
| R11 | .1 megohm potentiometer. |
| R14 | 47,000 ohms. |
| R16, R19 | 1000 ohms. |
| R20 | 2700 ohms. |
| R21 | 6800 ohms. |
| C1 | .05 microfarad. |

| | |
|---|---|
| C2 | .005 microfarad. |
| C3 | 50 microfarads. |
| C4 | 50 microfarads. |
| C5 | 100 microfarads. |
| C6 | 25 microfarads. |
| D1, D2 | IN66 diodes. |
| D3 | 3AS1 diode. |
| T1, T2, T3, T4, T5 and T6 | 2NI68A transistors. |
| T7, T8 | 2N368 transistors. |
| Relay 52 | PW5LS–5000 ohm winding. |

When it is desired to change the intelligence of a particular encoder unit 10, it is merely necessary to pull out the code card 15 and to replace it with a different code card having holes 15b and 15c located in different positions. It is desirable to have the uppermost time reference brush grounded at the same position every time at hole 15a.

The change of the permutation on the encoder unit shown in FIGS. 5 and 6 is accomplished by removal of the pins 37 from behind the contact plates 36, and the reinsertion of the pins 37 in different holes 32a and in contact with different plates 36.

In connection with the encoder unit shown in FIGS. 7, 8 and 9, changing of the selected contact 46 can be accomplished merely by rotation of the shaft 42c of the switch 42 in order to ground a different contact 46. The switch 42 need not necessarily be a single-circuit switch, but can be a multiple-circuit switch adapted to ground more than one contact plate 46. As stated above, it is more desirable to have several switches than only one so that the permutations may be independently selected. This provides a greater number of selectable permutations, and is especially adaptable on a conveyor system having a large number of branch tracks 1t.

The scope of the invention is not to be limited to the particular embodiments shown in the drawings, for obviously changes may be made therein within the scope of the following claims. For example, it will be appreciated that in lieu of the specific "grounded" (through the trolley rail) electrical system shown and described herein, the encoder plate 12 need not be connected to the grounded trolley structure. In the alternative, the contact brushes 23 may be of dual instead of single form, arranged to be short circuited when finding duplicate openings in the card 15.

What is claimed is:

1. A conveyor dispatch control system for routing a carrier on a conveyor to a preselected destination beyond conveyor route switching means, comprising a read-out unit fixed adjacent said conveyor ahead of said switching means, said read-out unit having at least two ground sensor probes; a read-out circuit connected to said probes and controlled thereby to actuate said track switching means, said read-out circuit comprising an "and" circuit connected to all of said probes; a reference circuit connected to one of said probes and serving as a time reference probe, said "and" circuit and said reference circuit being both connected to an interpreter stage and controlling the output voltage thereof such that a first voltage is obtained whenever all of the probes are simultaneously grounded, and such that a second voltage is obtained whenever the probe connected to the reference circuit is grounded but less than all the other probes are grounded; and flip-flop means actuating said route switching means and controlled by the output voltage of said interpreter stage, the condition of conductivity of said flip-flop being selectively determined by said first and second voltages.

2. In a system as set forth in claim 1, said interpreter stage comprising an amplifier having a load resistance in its output circuit across which said voltages appear in accordance with the bias conditions on an input circuit electrode and on an electrode common to both input and output circuits; said reference circuit comprising an amplifier connected with the common electrode and controlling its bias according to whether or not said reference probe is grounded; and said "and" circuit comprising separate amplifiers each connected to a probe and each having an output circuit connected to the input circuit electrode of said interpreter stage, said "and" circuit changing the bias thereon when all of the probes are grounded.

3. In a system as set forth in claim 2, the reference circuit amplifier comprising a transistor having a base connected to said reference probe, having a collector connected to a source of potential and having an emitter circuit connected through a resistance to a bias said common electrode toward cut-off; means for forward biasing said base, the forward bias being short circuited when said reference probe is grounded; and the amplifiers of the "and" circuit each comprising a transistor having a base connected to one of said probes, having a collector connected to a source of potential, and having an emitter, the emitters being connected in parallel and to said input circuit electrode; and means for forward biasing said bases to render said "and" circuit transistors conductive to thereby bias input circuit electrode toward maximum conductivity, the biasing effects on said input and common electrodes being opposed whereby when the reference probe and less than all the other probes are grounded the output voltage of the interpreter stage will be decreased, and when all the probes are grounded the output voltage of the interpreter stage will be increased.

4. A system for actuating selector means in response to the contacting of a first unit by a second unit, said system comprising a plate on said first unit; a grounding reference probe and at least one other grounding probe, all of the probes being supported on said plate; at least two electronic valves each having an input circuit electrode connected to one of said probes, and said electrodes being normally biased at a potential different from ground, at least one of said valves being a reference valve and being connected to said reference probe, and one valve being connected to each of said other probes, and each of the valves having two electrodes in its output circuit; an interpreter stage having an output load resistance and having two electrodes in its input circuit so related that voltages of the same polarity affect the conductivity of this stage oppositely when applied to the two electrodes in its input circuit, the valve associated with the reference electrode having its output electrodes connected between one of said input electrodes and a source of potential, and the valves associated with said other electrodes all having their respective output electrodes connected mutually in parallel and between the other of said input electrodes and the same source of potential; flip-flop means controlled by the output voltage of said interpreter stage and connected to actuate said selector means; and said second unit having grounded areas disposed opposite the probes on said plate.

5. In a system as set forth in claim 4, at least three grounding probes including the reference probe, and at least three valves other than the reference valve, and the latter valve being connected to the reference probe together with one of the other valves, and all of the valves being biased conductive when the associated probe is ungrounded, whereby when all of the probes other than the reference probe are grounded, the valve connected to the same probe as the reference valve and having its output circuit connected in parallel with the other valves will nullify their effect on the interpreter stage.

6. In a system as set forth in claim 5, said interpreter stage comprising an electronic amplifier normally biased to deliver a steady-state output voltage of value insufficient to actuate said flip-flop means when all of said valves are conductive, and said reference valve when rendered non-conductive by grounding of its probe forward biasing said amplifier to saturation to deliver a downward pulse to control the flip-flop, and said valves when all rendered nonconductive by grounding of all probes removing all forward bias and cutting off said amplifier to deliver an upward pulse to control said flip-flop, and any other combination of probe groundings having no effect on said steady-state output voltage.

7. In a system as set forth in claim 4, time constant means between said interpreter stage and said flip-flop means for eliminating spurious effects on the latter means caused by slight variations in the instants of contact of the various sensor probes.

8. A conveyor dispatch system for routing a carrier on a conveyor to a preselected destination beyond conveyor route switching means, comprising a read-out unit positionally fixed ahead of the switching means, said read-out unit having at least two sensor means for cooperation with carriers passing thereby, a read-out circuit for actuating said switching means, said read-out circuit including flip-flop means actuating said switching means, trigger means for controlling said flip-flop means, and trigger control means connected to said sensor means to actuate said trigger means, said trigger control means including a first electronic switch connected with one of said sensor means and a further electronic switch connected to the other of said sensor means said trigger control means also including means for applying a voltage having an average value to said trigger means which is ineffective to actuate said flip-flop means, in response to closed condition of at least said further electronic switch, and for applying voltages to said trigger means having values greater and lesser than said average value to actuate said flip-flop means to one or the other of its stable conditions, in response to opening of both said electronic switches on one hand and to opening of said further electronic switch while said first electronic switch is closed on the other hand.

9. The system according to claim 8 wherein said trigger means is a D.C. amplifier in the form of a transistor connected as a common collector circuit, the voltage of said trigger control means being applied to the base of said transistor.

10. The system according to claim 9 wherein said trigger control means includes an interpreter stage for applying said voltages to the base of said transistor, the interpreter stage being in the form of a transistor having its base connected to a source of positive potential through said first electronic switch and its emitter connected to a source of positive potential through said further electronic switch.

11. A conveyor dispatch control system for routing a carrier on a conveyor to a preselected destination beyond conveyor switching means, comprising read-out means positionally fixed ahead of said switching means and including a plurality of sensor means, a read-out circuit connected to said sensor means, said read-out circuit including flip-flop means for actuating said switching means in response to grounding of all said sensor means and grounding of a selected one of said sensor means and less than all the other sensor means to operate said flip-flop means between its stable conditions, said read-out circuit being ineffective to alter the condition of said flip-flop means in response to all other conditions of said sensor means.

References Cited in the file of this patent

UNITED STATES PATENTS

| | | |
|---|---|---|
| 1,797,864 | Harlandt | Mar. 24, 1931 |
| 2,674,727 | Spielberg | Apr. 6, 1954 |
| 2,682,573 | Hunt | June 29, 1954 |
| 2,762,464 | Wilcox | Sept. 11, 1956 |
| 2,795,328 | Tyler | June 11, 1957 |
| 2,877,718 | Mittag | Mar. 17, 1959 |

FOREIGN PATENTS

| | | |
|---|---|---|
| 487,860 | Germany | Dec. 18, 1929 |
| 798,538 | Great Britain | July 23, 1958 |

UNITED STATES PATENT OFFICE
CERTIFICATE OF CORRECTION

Patent No. 3,126,837                        March 31, 1964

Paul R. Noye et al.

It is hereby certified that error appears in the above numbered patent requiring correction and that the said Letters Patent should read as corrected below.

Column 7, line 66, for "to" read -- be --; column 8, line 13, for "one" read -- none --; line 46, for "it" read -- its --; column 10, line 13, strike out "a", second occurrence.

Signed and sealed this 21st day of July 1964.

(SEAL)

Attest:

ESTON G. JOHNSON
Attesting Officer

EDWARD J. BRENNER
Commissioner of Patents